US012736644B2

(12) United States Patent
Fan et al.

(10) Patent No.: US 12,736,644 B2
(45) Date of Patent: Sep. 15, 2026

(54) METHOD FOR CALIBRATING MOBILE VEHICLE

(71) Applicant: CHINA MOTOR CORPORATION, Taipei (TW)

(72) Inventors: Yi-Fu Fan, Taipei (TW); Yu-Sung Chen, Taipei (TW)

(73) Assignee: CHINA MOTOR CORPORATION, Taipei (TW)

( * ) Notice: Subject to any disclaimer, the term of this patent is extended or adjusted under 35 U.S.C. 154(b) by 98 days.

(21) Appl. No.: 18/812,614

(22) Filed: Aug. 22, 2024

(65) Prior Publication Data

US 2026/0036686 A1 Feb. 5, 2026

(30) Foreign Application Priority Data

Jul. 31, 2024 (TW) ................................ 113128567

(51) Int. Cl.

| | |
|---|---|
| ***G01S 7/00*** | (2006.01) |
| ***B60W 50/06*** | (2006.01) |
| ***G01C 22/00*** | (2006.01) |
| ***G01S 7/497*** | (2006.01) |
| ***G01S 17/89*** | (2020.01) |
| ***G01S 17/931*** | (2020.01) |

(52) U.S. Cl.

CPC ............ *G01S 7/497* (2013.01); *B60W 50/06* (2013.01); *G01C 22/00* (2013.01); *G01S 17/89* (2013.01); *G01S 17/931* (2020.01)

(58) Field of Classification Search

CPC ........ G01S 7/497; G01S 17/931; G01S 17/89; B60W 50/06; G01C 22/00

USPC ........................................................ 701/33.1

See application file for complete search history.

(56) References Cited

U.S. PATENT DOCUMENTS

| | | | | |
|---|---|---|---|---|
| 2021/0004610 A1* | 1/2021 | Huang | .................... | G01S 17/10 |
| 2024/0017731 A1* | 1/2024 | Fasola | .................... | G07C 5/008 |
| 2024/0142588 A1* | 5/2024 | Alismail | ................ | G01S 17/89 |

FOREIGN PATENT DOCUMENTS

| | | |
|---|---|---|
| CN | 107918386 A | 4/2018 |
| CN | 116360451 A | 6/2023 |

OTHER PUBLICATIONS

Taiwanese Search Report for Taiwanese Application No. 113128567, dated Feb. 11, 2025, with English translation.

* cited by examiner

*Primary Examiner* — Tiffany P Young

(74) *Attorney, Agent, or Firm* — Birch, Stewart, Kolasch & Birch, LLP

(57) ABSTRACT

A method for calibrating a mobile vehicle includes the following. The mobile vehicle performs a calibrating process, during which an odometer module of the mobile vehicle obtains a movement dataset related to movements of the mobile vehicle, and a lidar module of the mobile vehicle obtains a distance dataset related to distances to surroundings detected by the lidar module. A control module generates a variation dataset based on the movement dataset, where the variation dataset is related to changes in pose of the lidar module during the calibrating process. The control module generates a calibrated coordinate parameter and a calibrated angle parameter based on the variation dataset and the distance dataset, where the calibrated coordinate parameter is related to a position of the lidar module on the mobile vehicle, and where the calibrated angle parameter is related to an angle of the lidar module relative to the mobile vehicle.

9 Claims, 7 Drawing Sheets

METHOD FOR CALIBRATING MOBILE VEHICLE

CROSS-REFERENCE TO RELATED APPLICATION

This application claims priority to Taiwanese Invention Patent Application No. 113128567, filed on Jul. 31, 2024, the entire disclosure of which is incorporated by reference herein.

FIELD

The disclosure relates to an automatic calibration method, and more particularly to a method for automatically calibrating a mobile vehicle.

BACKGROUND

A smart mobile vehicle (e.g., a wheeled mobile robot or an automated guided vehicle (AGV)) can automatically move along a set route and is widely used for transporting goods.

Since the smart mobile vehicle may be assembled using various components with different mechanical tolerances, the components (e.g., sensors or wheels) may be installed with slight deviations in terms of positioning or angles. Therefore, such a smart mobile vehicle may deviate from the set route when they are operated. Moreover, when the smart mobile vehicle has been operating for a long time, the smart mobile vehicle may also deviate from the set route due to mechanical fatigue or deformation. To ensure that the smart mobile vehicle can accurately and stably move along the set route, the parameter values of the smart mobile vehicle need to be calibrated regularly.

However, manually calibrating the parameter values of an odometer and a light detection and ranging (lidar) device of the smart mobile vehicle is a cumbersome process (usually requiring half an hour to one and a half hours), and an accuracy of the calibration relies heavily on the skill and experience of the person performing the calibration.

SUMMARY

Therefore, an object of the disclosure is to provide a method for calibrating a mobile vehicle that can alleviate at least one of the drawbacks of the prior art.

According to the disclosure, a method for automatically calibrating a mobile vehicle includes: the mobile vehicle performing a calibrating movement process, during which an odometer module of the mobile vehicle obtains a movement dataset related to movements of the mobile vehicle, and a lidar module of the mobile vehicle obtains a distance dataset related to distances to surroundings detected by the lidar module; the control module generating a first lidar-related variation dataset based on the movement dataset, where the first lidar-related variation dataset is related to changes in pose of a lidar coordinate system of the lidar module during the calibrating movement process, and where the changes in pose of the lidar coordinate system are estimated by the control module; and the control module generating a calibrated coordinate parameter set and a calibrated angle parameter set based on the first lidar-related variation dataset and the distance dataset, where the calibrated coordinate parameter set is related to a position of the lidar module on the mobile vehicle, and where the calibrated angle parameter set is related to an angle of the lidar module relative to the mobile vehicle.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
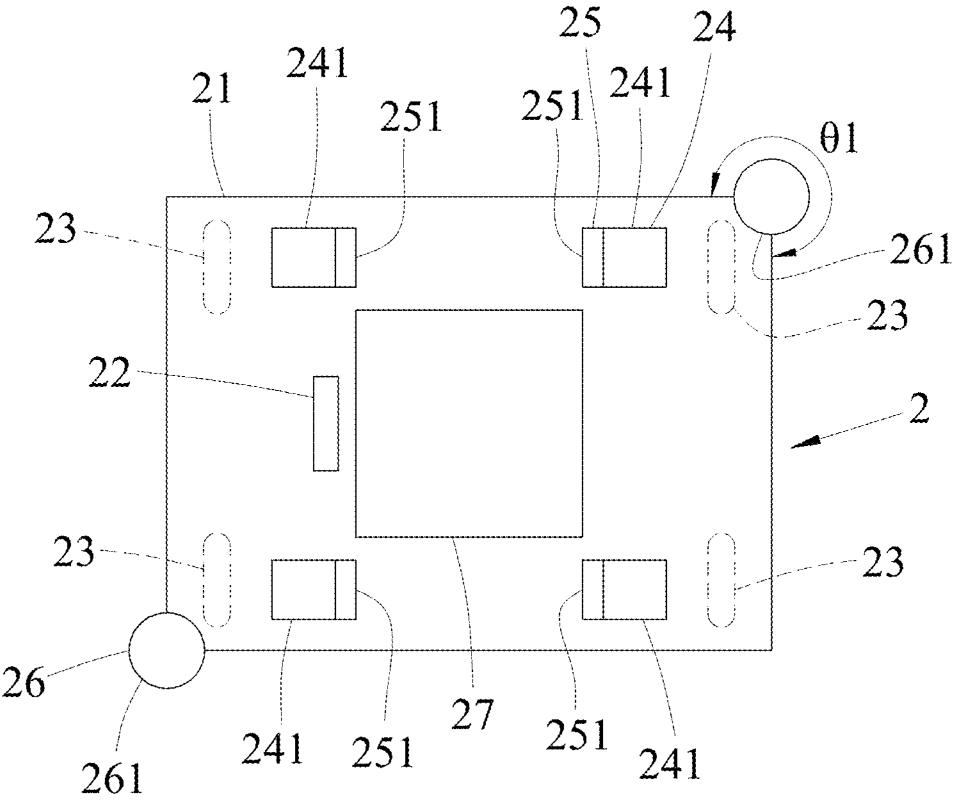
FIG. 1 is a schematic view illustrating a mobile vehicle according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
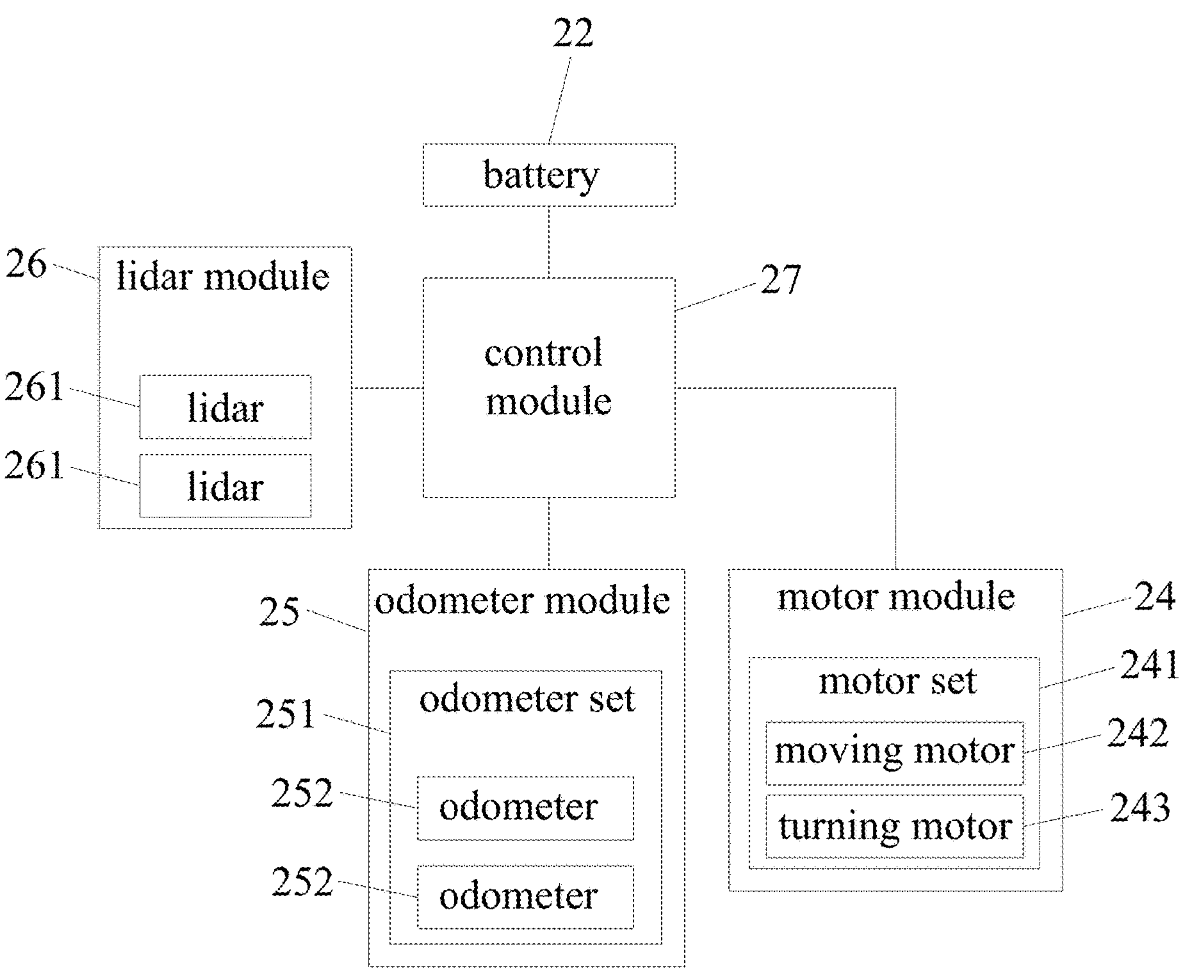
FIG. 2 is a block diagram illustrating the mobile vehicle according to an embodiment of the disclosure.

Referring to FIGS. 1 and 2, according to an embodiment of the disclosure, a method for automatically calibrating a mobile vehicle 2 is provided. The mobile vehicle 2 may be, for example, a wheeled mobile robot or an automated guided vehicle (AGV), etc., and includes a base 21, a battery 22, a plurality of wheels 23, a motor module 24, an odometer module 25, a light detection and ranging (lidar) module 26 and a control module 27. In this embodiment, the wheels 23 are driving wheels and are mounted below the base 21. The lidar module 26 and the control module 27 are disposed on the base 21. The battery 22 is disposed on the base 21 to provide power for use by the mobile vehicle 2.

The motor module 24 includes a plurality of motor sets 241 disposed corresponding to the wheels 23 respectively. It should be noted that only one of the motor sets 241 is shown in FIG. 2 for the sake of clarity. Each of the motor sets 241 includes a moving motor 242 that is configured to drive the corresponding one of the wheels 23 to move forward or backward, and a turning motor 243 that is configured to drive the corresponding one of the wheels 23 to turn to a different direction.

The odometer module 25 includes a plurality of odometer sets 251 disposed corresponding to the motor sets 241 respectively. It should be noted that only one of the odometer sets 251 is shown in FIG. 2 for the sake of clarity. Each of the odometer sets 251 includes two odometers 252 corresponding respectively to the moving motor 242 and the turning motor 243 of the corresponding motor set 241, where the two odometers 252 are configured to detect a rotation angle of the moving motor 242 and a rotation angle of the turning motor 243, respectively. As such, the odometer module 25 may calculate a traveling distance of the mobile vehicle 2 based on the rotation angle of each of the moving motors 242, the rotation angle of each of the turning motors 243, and a ratio that converts the rotation angle of the moving motor 242 and the rotation angle of the turning motor 243 to a travel distance of the corresponding wheel 23. It should be noted that the odometer sets 251 may also be disposed corresponding to the wheels 23 respectively, and each of the odometer sets 251 is configured to detect a rotation angle of the corresponding wheel 23. In such a case, the odometer module 25 may calculate the traveling distance of the mobile vehicle 2 based on the rotation angle of each of the wheels 23, and calculate a ratio that converts the rotation angle of the wheel 23 to a travel distance of the wheel 23.

The lidar module 26 includes two lidars 261 disposed respectively at two diagonally opposite corners of the base 21 (e.g., upper right corner and bottom left corner). Each of the lidars 261 is configured to detect distances to the surrounding environment from the lidar 261. In this embodiment, each of the lidars 261 may be implemented with, for example, a laser distance sensor made by SICK Inc. (model type S30B-2011 GB), which has a scanning angle ($\theta_1$) of 270 degrees, an angular resolution of 0.5 degrees, and a distance measuring range of from 0.05 meters to 30 meters. As such, a field of view of the lidar module 26 may cover 360 degrees around the mobile vehicle 2.

The control module 27 is electrically connected to the battery 22, the motor module 24, the odometer module 25 and the lidar module 26. The control module 27 is configured to receive information detected by the odometer module and the lidar module 26, and is configured to control the motor module 24 to operate. In this embodiment, the control module 27 may be implemented with, for example, an industrial computer made by Advantech Co., Ltd. (model type ARK-2250L), which includes a $6^{th}$ generation Intel® Core™ U-series central processing unit (CPU), an Ubuntu 18.04 operating system, DDR3 4G random access memory (RAM), and six universal serial bus (USB) 3.0 communication ports.

Prior to performing the method for automatically calibrating the mobile vehicle 2, an initial coordinate parameter set and an initial angle parameter set for each of the lidars 261 may be manually inputted to the control module 27, or may be set to default values by the control module 27. Specifically, the initial coordinate parameter set is related to a disposed position of the lidar 261 on the mobile vehicle 2, and the initial angle parameter set is related to a disposed angle of the lidar 261 on the mobile vehicle 2. In this embodiment, the method is implemented using, for example, a robot operating system (ROS).

Figure 3:
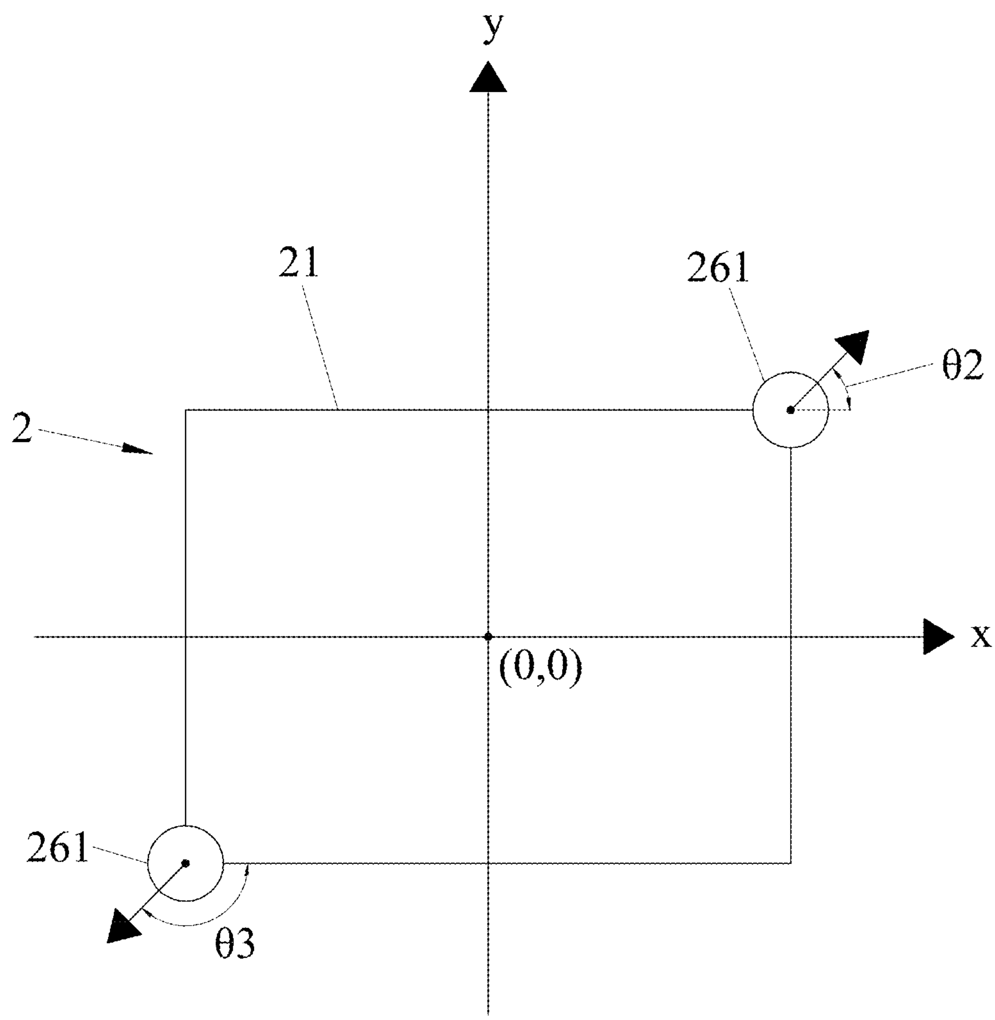
FIG. 3 is a plot for explaining a coordinate parameter set and an angle parameter set according to an embodiment of the disclosure.
Figure 4:
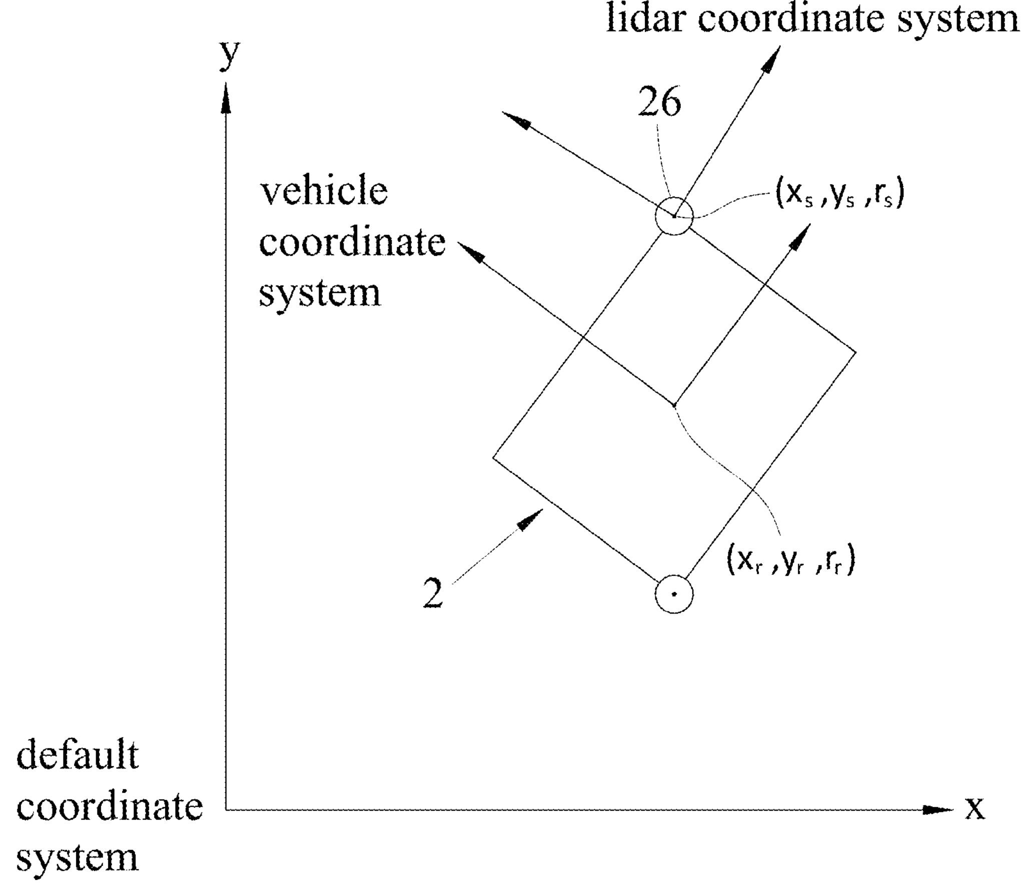
FIG. 4 is a plot illustrating a lidar coordinate system and a vehicle coordinate system defined in a default coordinate system according to an embodiment of the disclosure.

Referring further to FIGS. 3 and 4, the method for calibrating the mobile vehicle 2 includes a first procedure for calibrating the lidar module 26, which includes steps (A) to (D).

In step (A), the mobile vehicle 2 performs a calibrating movement process, during which the odometer module 25 obtains a movement dataset. The movement dataset is related to movements of the mobile vehicle 2 during the calibrating movement process. Specifically, the movement dataset may include, for each of the odometer sets 251, the rotation angle of the moving motor 242 and the rotation angle of the turning motor 243 detected by the odometer set 251 over time, which may further be calculated into the traveling distance of the mobile vehicle 2, or may even further be calculated into changes in the traveling distance of the mobile vehicle 2 over time.

To describe in further detail, during the calibrating movement process, the mobile vehicle 2 moves from a starting point to an ending point within an area that has a plurality of marked objects, and performs a plurality of actions while moving. The actions include moving straight forward, moving straight backward, turning while moving forward, and turning while moving backward, and each of the actions may be performed for multiple times. In this embodiment, the ending point is identical to the starting point. The marked objects may be walls, pillars, or objects with specific marks or shapes, and are used for the lidar module 26 to recognize the area by detecting distances reflected respectively from the marked objects. In one example, the area has a flat and clean floor. In one example, a movement speed of the mobile vehicle 2 during the calibrating movement process ranges from 15 m/min to 60 m/min.

In step (B), the control module 27 generates, for each of the lidars 261, a first lidar-related variation dataset based on the movement dataset. The first lidar-related variation dataset is related to changes in pose (i.e., changes in position and angle) of a lidar coordinate system of the lidar 261 during the calibrating movement process, where the changes are estimated by the control module 27 based on the movement dataset.

To describe in further detail, the control module 27 first generates a vehicle-related variation dataset based on the movement dataset, and then generates the first lidar-related variation dataset based on the vehicle-related variation dataset. The vehicle-related variation dataset is related to changes in pose (i.e., changes in position and angle) of the mobile vehicle 2 during the calibrating movement process, where the changes are estimated by the control module 27 based on the movement dataset. In practice, the control module 27 may generate, based on the movement dataset, pose data of a vehicle coordinate system of the mobile vehicle 2 in a default coordinate system. In one embodiment, the control module 27 generates, based on a first sampling frequency (i.e., a sampling frequency of the odometer module 25), coordinate values ($x_r$, $y_r$, $r_r$) of the vehicle coordinate system in the default coordinate system at each sampling time point related to the first sampling frequency (the pose data). The coordinate values ($x_r$, $y_r$) indicate a position of an origin of the vehicle coordinate system in the default coordinate system, and the coordinate value ($r_r$) indicates an angle of the vehicle coordinate system with respect to the default coordinate system. In this embodiment, the origin of the vehicle coordinate system is defined as a geometric center of the mobile vehicle 2, but the disclosure is not limited to such. Then, the coordinate values ($x_r$, $y_r$, $r_r$) at each of the sampling time points are converted to changes in pose ($\Delta x_r$, $\Delta y_r$, $\Delta r_r$) (i.e., changes in position and angle) of the vehicle coordinate system in the default coordinate system per unit time (the vehicle-related variation dataset).

Then, the control module 27 generates, for each of the lidars 261, changes in pose of the lidar coordinate system of the lidar 261 in the default coordinate system (i.e., the first lidar-related variation dataset) based on the vehicle-related variation dataset and a conversion parameter set. Specifically, the first lidar-related variation dataset includes changes in pose ($\Delta x_s$, $\Delta y_s$, $\Delta r_s$) (i.e., changes in position and angle) of the lidar coordinate system of the lidar 261 in the default coordinate system per unit time. To describe in further detail, the conversion parameter set is related to conversion correspondence between the vehicle coordinate system and the lidar coordinate system, and can be derived from the disposed position and the disposed angle of the lidar 261 on the mobile vehicle 2 (i.e., based on the initial coordinate parameter set and the initial angle parameter set). For example, the initial coordinate parameter set and the initial angle parameter set may be used to obtain coordinate values ($x_s$, $y_s$, $r_s$) of the lidar coordinate system of the lidar 261 in the default coordinate system. The coordinate values ($x_s$, $y_s$) indicate a position of an origin of the lidar coordinate system in the default coordinate system, and the coordinate value ($r_s$) indicates an angle of the lidar coordinate system with respect to the default coordinate system. It should be noted that the origin of the lidar coordinate system is defined as a geometric center of the lidar 261, but the disclosure is not limited to such.

In step (C), each of the lidars 261 of the lidar module 26 obtains a distance dataset related to distances to surroundings detected by the lidar 261 during the calibrating movement process. The distance dataset is related to distances from the lidar 261 to obstacles in the surroundings (e.g., the marked objects) over time during the calibrating movement process, which may further be calculated, based on a second sampling frequency (i.e., a sampling frequency of the lidars 261), to obtain change in distances between each sampling time point related to the second sampling frequency.

In step (D), the control module 27 generates, for each of the lidars 261, a calibrated coordinate parameter set and a calibrated angle parameter set based on the first lidar-related variation dataset and the distance dataset both corresponding to the lidar 261. That is to say, the initial coordinate parameter set is calibrated to the calibrated coordinate parameter set, and the initial angle parameter set is calibrated to the calibrated angle parameter set.

To describe in further detail, the control module 27 generates, for each of the lidar 261, a second lidar-related variation dataset based on the distance dataset obtained by the lidar 261, and then generates the calibrated coordinate parameter set and the calibrated angle parameter set based on the first lidar-related variation dataset and the second lidar-related variation dataset that corresponds to the lidar 261 using a point-cloud registration algorithm. Specifically, the second lidar-related variation dataset includes changes in pose ($\Delta x'_s$, $\Delta y'_s$, $\Delta r'_s$) (i.e., changes in position and angle) of the lidar coordinate system of the lidar 261 in the default coordinate system per unit time, where the changes are detected by the lidar 261.

That is to say, the control module 27 generates, for each of the lidars 261, the calibrated coordinate parameter set and the calibrated angle parameter set using the point-cloud registration algorithm based on the first lidar-related variation dataset that is generated based on the movement dataset, and based on the second lidar-related variation dataset that is generated based on the distance dataset obtained by the lidar 261. The calibrated coordinate parameter set indicates the position of the lidar 261 on the mobile vehicle 2 more accurately compared to the initial coordinate parameter set, and the calibrated angle parameter set indicates the angle of the lidar 261 relative to the mobile vehicle 2 more accurately compared to the initial angle parameter set. As such, the first lidar-related variation dataset that is obtained based on both the calibrated coordinate parameter set and the calibrated angle parameter set may be closer to the second lidar-related variation dataset.

In this embodiment, the origin (0, 0) of the vehicle coordinate system is defined to be the geometric center of the mobile vehicle 2, and for each of the lidars 261, the calibrated angle parameter set (or the initial angle parameter set) is defined as an angle between a central vector that divides the field of view of the lidar 261 into half and an x-axis of the vehicle coordinate system (as shown in FIG. 3). The calibrated angle parameter set has a positive value in a counterclockwise direction from a positive part of the x-axis, and has a negative value in a clockwise direction from the positive part of the x-axis. In one example, for the lidar 261 disposed at the top right corner of the mobile vehicle 2 in FIG. 3, the calibrated coordinate parameter set is equal to (0.51 m, 0.34 m), and the calibrated angle parameter set is equal to 0.795 rad, meaning that the lidar 261 disposed at the top right corner is 51 cm to the right of a y-axis of the vehicle coordinate system, is 34 cm above the x-axis, and an angel ($\theta_2$) between the central vector of this lidar 261 and the positive part of the x-axis is about 45.55 degrees (i.e., 0.795 rad). In another example, for the lidar 261 disposed at the bottom left corner of the mobile vehicle 2 in FIG. 3, the calibrated coordinate parameter set is equal to (−0.51 m, −0.34 m), and the calibrated angle parameter set is equal to −2.369 rad, meaning that the lidar 261 disposed at the bottom left corner is 51 cm to the left of the y-axis, is 34 cm below the x-axis, and an angel ($\theta_3$) between the central vector of this lidar 261 and the positive part of the x-axis is about −135.75 degrees (i.e., −2.369 rad).

The point-cloud registration algorithm may be point-to-line iterative closest point (PL-ICP), non-rigid ICP, normal distributions transform (NDT), generalized ICP (GICP), feature-based registration, etc. In this embodiment, the point-cloud registration algorithm is implemented using PL-ICP.

Figure 5:
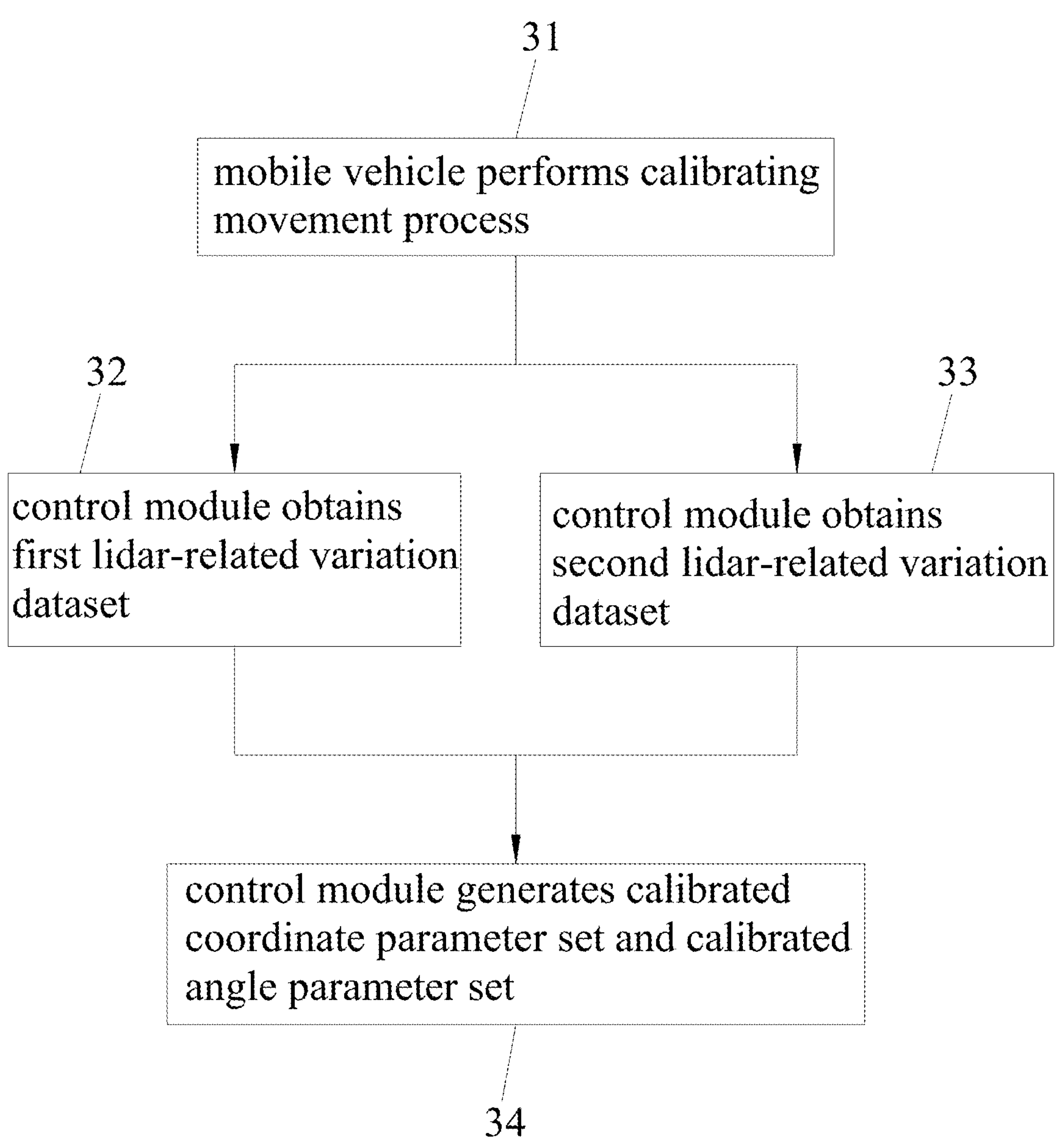
FIG. 5 is a flow chart illustrating a first procedure for calibrating a lidar module of the mobile vehicle according to an embodiment of the disclosure.

Referring to FIGS. 1, 2, and 5, the first procedure for automatically performing calibration between the mobile vehicle 2 and the lidar module 26 includes steps 31 to 34. In step 31, the mobile vehicle 2 performs the calibrating movement process, during which the mobile vehicle 2 performs actions (e.g., moving straight forward, moving straight backward, turning while moving forward, and turning while moving backward) for multiple times and returns to the starting point (i.e., the ending point). While performing the calibrating movement process, the odometer module 25 obtains and sends the movement dataset (e.g., the rotation angle of the moving motor 242 and the rotation angle of the turning motor 243 detected by each of the odometer sets 251) to the control module 27, and each of the lidars 261 of the lidar module 26 obtains and sends the distance dataset (e.g., distances to the surroundings detected by the lidar 261) to the control module 27. In this embodiment, a duration of the calibrating movement process is about 2 minutes to 3 minutes, the movement dataset obtained by the odometer module 25 includes about 10000 to 20000 pieces of data, and the distance dataset obtained by each of the lidars 261 includes about 3000 to 5000 pieces of data.

In step 32, the control module 27 obtains the first lidar-related variation dataset based on the movement dataset. In step 33, the control module 27 obtains the second lidar-related variation dataset for each of the lidars 261 based on the distance dataset obtained by the lidar 261. In step 34, the control module 27 generates, for each of the lidars 261, the calibrated coordinate parameter set and the calibrated angle parameter set using the point-cloud registration algorithm (e.g., PL-ICP) based on the first lidar-related variation dataset and the second lidar-related variation dataset that corresponds to the lidar 261.

It should be noted that steps 31 to 34 and the flow chart shown in FIG. 5 merely constitute one example of the disclosure, and steps 31 to 34 may be combined, divided, or switched in order as long as the first procedure under such adjustment achieves substantially the same function in substantially the same way as provided in the embodiment.

Figure 7:
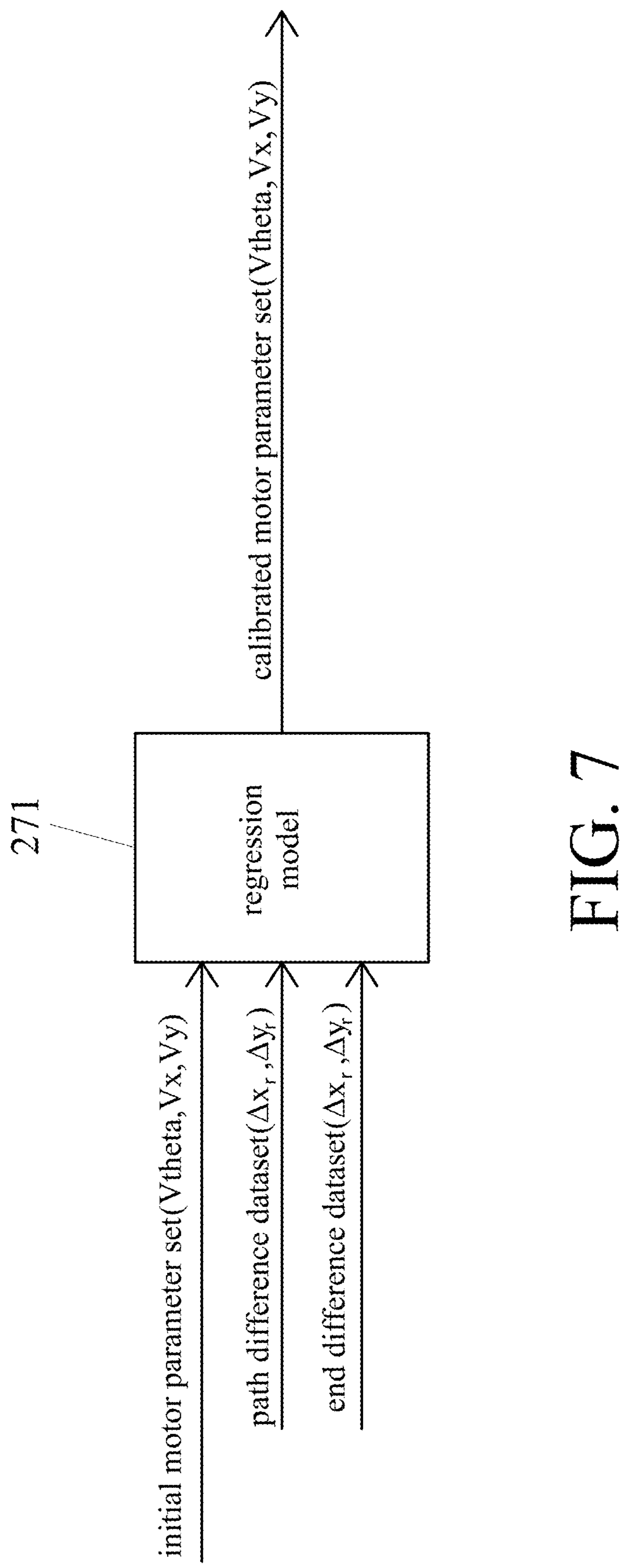
FIG. 7 is a schematic diagram illustrating a regression model used in the method for calibrating the mobile vehicle according to an embodiment of the disclosure.

Referring to FIGS. 1, 4, and 7, the method for calibrating the mobile vehicle 2 further includes a second procedure for calibrating the motor module 24. The second procedure includes steps (E) to (G), and is performed after step (A) of the first procedure. Prior to performing the method for calibrating the mobile vehicle 2, an initial motor parameter set for the motor module 24 may also be manually inputted to the control module 27, or may be set to default values by the control module 27.

In step (E), after performing the calibrating movement process, the control module 27 generates a first path dataset based on the movement dataset obtained by the odometer module 25, and generates a second path dataset based on the distance datasets obtained by the lidars 261, respectively. The first path dataset is related to a first path of the mobile vehicle 2 during the calibrating movement process, where the first path is estimated by the control module 27 based on the movement dataset. The second path dataset is related to a second path of the mobile vehicle 2 during the calibrating movement process, where the second path is estimated by the control module 27 based on the distance datasets. Specifically, the first path dataset includes a first set of locations (e.g., coordinates $(x_r, y_r)$) of the geometric center of the mobile vehicle 2 in the default coordinate system respectively at a first set of time points (e.g., corresponding to the sampling frequency of the odometer module 25) during the calibrating movement process, and the second path dataset includes a second set of locations (e.g., coordinates $(x'_r, y'_r)$) of the geometric center of the mobile vehicle 2 in the default coordinate system respectively at a second set of time points (e.g., corresponding to the sampling frequency of the lidars 261) during the calibrating movement process.

In step (F), the control module 27 generates a path difference dataset and an end difference dataset based on the first path dataset and the second path dataset. The path difference dataset is related to differences between the first path and the second path during the calibrating movement process at different time points (i.e., $(x_r-x'_r, y_r-y'_r)$ for each time point, represented by $(\Delta x_{time-r}, \Delta y_{time-r})$), and the end difference dataset is related to a difference between the first path dataset and the second path dataset at an end time point of the calibrating movement process (i.e., $(x_r-x'_r, y_r-y'_r)$ for the end time point, represented by $(\Delta x_{end\_time-r}, \Delta y_{end\_time-r})$.

Since the sampling time points for the first path dataset and the sampling time points for the second path data set may be different, the control module 27 first matches the first path dataset and the second path dataset according to a third set of time points. Then, the control module 27 normalizes the first path dataset and the second path dataset that have been matched, and generates the path difference dataset and the end difference dataset based on the first path dataset and the second path dataset thus matched and normalized.

To describe in further detail, the control module 27 matches the first path dataset and the second path dataset in terms of time using interpolation or regression. In one example, the third set of time points may be equal to the first set of time points, and the control module 27 performs interpolation or regression for the second path dataset (or the distance datasets). In another example, the third set of time points may be equal to the second set of time points, and the control module 27 performs interpolation or regression for the first path dataset (or the movement dataset). In yet another example, the third set of time points is a set of predetermined time points, and the control module 27 performs interpolation or regression for both the first path dataset and the second path dataset. Since performing interpolation and regression to match two different datasets is well known to one having ordinary skill in the art, it will not be described in further detail for the sake of brevity.

Then, the control module 27 normalizes the first path dataset and the second path dataset that have been matched using, for example, min-max normalization, Z-score standardization, maximum absolute scaling, robust scaling, log transformation, etc. In this embodiment, the control unit 27 uses min-max normalization to normalize datasets.

In step (G), the control module 27 generates a calibrated motor parameter set based on the initial motor parameter set, the path difference dataset and the end difference dataset, where the calibrated motor parameter set is for adjusting a speed of the motor module 24 of the mobile vehicle 2. That is to say, the initial motor parameter set is calibrated to the calibrated motor parameter set. As such, the motion of the mobile vehicle 2 detected by the odometer module 25 may better match the motion of the mobile vehicle 2 detected by the lidar module 26.

In this embodiment, the control module 27 adjusts the speed of the motor module 24 by multiplying the speed of the motor module 24 by the calibrated motor parameter set, thereby promoting accuracy of the odometer module 25. The calibrated motor parameter set may be a set of ratios including $(V_{theta}, V_x, V_y)$, and the initial motor parameter set is set to be (1.0, 1.0, 1.0). Specifically, $V_{theta}$ is related to a turning speed of the turning motor 243, $V_x$ is related to a left-right speed of the moving motor 242, and $V_y$ is related to a forward-backward speed of the moving motor 242. In one example, after obtaining the calibrated motor parameter set, if the left-right speed of the moving motor 242 was set to be 0.5 m/s, the control module 27 would multiply the left-right speed by the ratio $V_x$ (assumed to be 1.015852 herein) in the calibrated motor parameter set, and thus the left-right speed would be adjusted to 0.508 m/s.

In practice, the calibrated motor parameter set may be generated using a regression model 271. The regression model may be, for example, a multiple polynomial regression model, a simple linear regression model, a multivariable regression model, etc. In this embodiment, the regression model 271 is a multiple polynomial regression model.

The regression model 271 is trained before performing the second procedure. To describe in further detail, when training the regression model 271, the initial motor parameter set is set to be (1.0, 1.0, 1.0), and a plurality of pairs (e.g., 52 pairs) of the path difference dataset and the end difference dataset are obtained based on the initial motor parameter set. The pairs are divided into a training group (e.g., 40 pairs) and a testing group (e.g., 12 pairs), and the regression model 271 is trained based on the training group. Specifically, the regression model 271 is trained based on a difference between the path difference dataset and the end difference dataset of each of the pairs that are in the training group, such that the calibrated motor parameter set generated by the regression model 271 allows the first path dataset to be closer to the second path dataset. Then, for each of the 12 pairs included in the testing group, the pair of the path difference dataset and the end difference dataset, and the initial motor parameter set are inputted to the regression model 271 to generate the calibrated motor parameter set for testing. When the calibrated motor parameter set generated from each of the 12 pairs is within a predetermined range, the training of the regression model 271 is determined to be completed.

Figure 6:
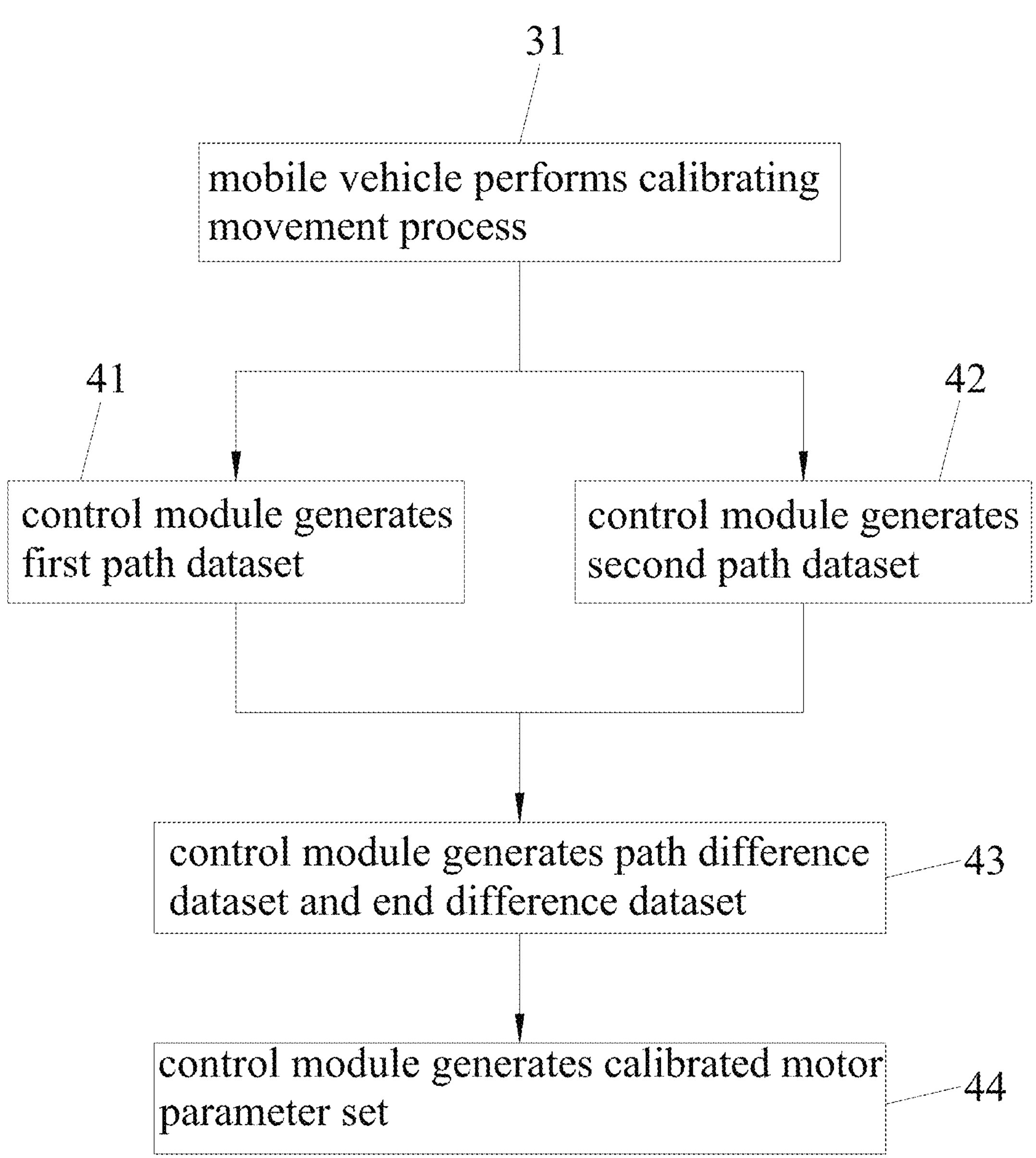
FIG. 6 is a flow chart illustrating a second procedure for calibrating a motor module of the mobile vehicle according to an embodiment of the disclosure.

Referring to FIGS. 2, 6, and 7, after calibrating the lidar module 26, the control module 27 may proceed to calibrate the motor module 24. When implementing the second procedure, a flow of the second procedure includes steps 41 to 44, which is performed after step 31.

In step 41, the control module 27 generates the first path dataset based on the movement dataset obtained by the odometer module 25. In step 42, the control module 27 generates the second path dataset based on the distance datasets obtained by the lidars 261 respectively. In step 43, the control module 27 generates the path difference dataset and the end difference dataset based on the first path dataset and the second path dataset. In step 44, the control module 27 generates the calibrated motor parameter set using the regression model 271 based on the initial motor parameter set, the path difference dataset and the end difference dataset.

It should be noted that steps 41 to 44 and the flow chart shown in FIG. 6 merely constitute one example of the disclosure, and steps 41 to 44 may be combined, divided, or switched in order as long as the second procedure under such adjustment achieves substantially the same function in substantially the same way as provided in the embodiment.

In summary, according to the disclosure, by performing the first procedure, the control module 27 is capable of obtaining the calibrated coordinate parameter set and the calibrated angle parameter set based on the movement dataset that is obtained by the odometer module 25 and the distance datasets that are obtained by the lidars 261 during the calibrating movement process, thus calibrating the lidar module 26. By performing the second procedure, the control module 27 is capable of obtaining the calibrated motor parameter set, thus calibrating the motor module 24. As such, an accuracy of the movement of the mobile vehicle 2 may be increased so that the mobile vehicle 2 may be capable of performing tasks that require high accuracy. The method may perform calibration for the mobile vehicle 2 without limiting the mobile vehicle 2 to move in a specific area along a specific trail, and without requiring manual calibration or manual adjustment for the mobile vehicle 2, thus avoiding impacts on the calibration quality from the skill and experience of the person performing the calibration. Moreover, the mobile vehicle 2 only requires 2 to 3 minutes to complete the calibrating movement process for performing the first procedure and the second procedure, which is very efficient.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatically calibrating a mobile vehicle, comprising:

the mobile vehicle performing a calibrating movement process, during which an odometer module of the mobile vehicle obtains a movement dataset related to movements of the mobile vehicle, and a light detection and ranging (lidar) module of the mobile vehicle obtains a distance dataset related to distances to surroundings detected by the lidar module;

the control module generating a first lidar-related variation dataset based on the movement dataset, where the first lidar-related variation dataset is related to changes in pose of a lidar coordinate system of the lidar module during the calibrating movement process, and where the changes in pose of the lidar coordinate system are estimated by the control module;

the control module generating a calibrated coordinate parameter set and a calibrated angle parameter set based on the first lidar-related variation dataset and the distance dataset, where the calibrated coordinate parameter set is related to a position of the lidar module on the mobile vehicle, and where the calibrated angle parameter set is related to an angle of the lidar module relative to the mobile vehicle;

the control module generating a first path dataset based on the movement dataset, and generating a second path dataset based on the distance dataset, where the first path dataset is related to a first path of the mobile vehicle during the calibrating movement process and is estimated based on the movement dataset, and where the second path dataset is related to a second path of the mobile vehicle during the calibrating movement process and is estimated based on the distance dataset;

the control module generating a path difference dataset and an end difference dataset based on the first path dataset and the second path dataset, where the path difference dataset is related to a difference between the first path and the second path during the calibrating movement process, and where the end difference dataset is related to a difference between the first path dataset and the second path dataset at an end time point of the calibrating movement process; and the control module generating a calibrated motor parameter set based on an initial motor parameter set, the path difference dataset and the end difference dataset, where the calibrated motor parameter set is for adjusting a speed of a motor module of the mobile vehicle that is configured to drive movement of the mobile vehicle.

2. The method as claimed in claim 1, wherein, during the calibrating movement process, the mobile vehicle moves from a starting point to an ending point within an area that has a plurality of marked objects, and performs a plurality of actions while moving.

3. The method as claimed in claim 2, wherein, the actions includes moving straight forward, moving straight backward, turning while moving forward, and turning while moving backward.

4. The method as claimed in claim 2, wherein the ending point is identical to the starting point.

5. The method as claimed in claim 1, wherein the generating of the first lidar-related variation dataset includes the control module generating a vehicle-related variation dataset based on the movement dataset, and then generating the first lidar-related variation dataset based on the vehicle-related variation dataset, where the vehicle-related variation dataset is related to changes in pose of the mobile vehicle during the calibrating movement process, and where the changes in pose of the mobile vehicle are estimated by the control module.

6. The method as claimed in claim 1, wherein the generating of the calibrated coordinate parameter set and the calibrated angle parameter set includes the control module generating a second lidar-related variation dataset based on the distance dataset, and then generating the calibrated coordinate parameter set and the calibrated angle parameter set based on the first lidar-related variation dataset and the second lidar-related variation dataset, wherein the second lidar-related variation dataset is related to changes in pose of the lidar coordinate system during the calibrating movement process, and where the changes in pose of the lidar coordinate system are detected by the lidar module.

7. The method as claimed in claim 1, wherein the calibrated coordinate parameter set and the calibrated angle parameter set are generated using a point-cloud registration algorithm.

8. The method as claimed in claim 1, wherein:

the first path dataset includes a first set of locations of the mobile vehicle respectively at a first set of time points during the calibrating movement process, and the first set of locations of the mobile vehicle are estimated by the control module based on the movement dataset;

wherein the second path dataset includes a second set of locations of the mobile vehicle respectively at a second set of time points during the calibrating movement process, and the second set of locations of the mobile vehicle are estimated by the control module based on the distance dataset; and the generating of the path difference dataset and the end difference dataset includes the control module matching the first path dataset and the second path dataset according to a third set of time points, normalizing the first path dataset and the second path dataset that have been matched, and then generating the path difference dataset and the end difference dataset based on the first path dataset and the second path dataset thus matched and normalized.

9. The method as claimed in claim 1, wherein the calibrated motor parameter set is generated using a regression model.

* * * * *